United States Patent [19]

Sendor

[11] 4,002,355
[45] Jan. 11, 1977

[54] BOOK WITH SOUND TRACK AND VISUAL DISPLAY

[76] Inventor: Bernard T. Sendor, 608 Blair Drive, Westbury, Long Island, N.Y. 11429

[22] Filed: July 16, 1975

[21] Appl. No.: 596,250

[52] U.S. Cl. .................................. 281/29; 35/8 A; 281/31; 206/387; 206/472
[51] Int. Cl.² ......................................... B42D 1/06
[58] Field of Search .................. 35/8 R, 8 A, 35 E; 206/387, 472, 473, 805; 281/15 R, 21 R, 29, 31

[56] References Cited

UNITED STATES PATENTS

| | | | |
|---|---|---|---|
| 2,226,409 | 12/1940 | Patterson et al. | 206/805 |
| 3,503,141 | 3/1970 | Schwartz | 35/8 A |

FOREIGN PATENTS OR APPLICATIONS

| | | | |
|---|---|---|---|
| 668,766 | 12/1965 | Belgium | 35/8 A |
| 797,324 | 7/1958 | United Kingdom | 35/8 R |

Primary Examiner—William H. Grieb
Attorney, Agent, or Firm—Roy C. Hopgood; John M. Calimafde; Eugene J. Kalil

[57] ABSTRACT

This specification discloses a cased-in book with overhanging hard covers; and a filler in the book made up of sheets having reading matter and/or pictures thereon, and the filler also includes a thick panel, made of material such as styrofoam, with one or more sockets in the thick panel for holding a sound record, preferably a tape cassette; and another socket, if desired, for holding transparent slides. The record and the transparences provide audio-visual adjuncts to the material set forth in the bound pages of the book.

10 Claims, 4 Drawing Figures

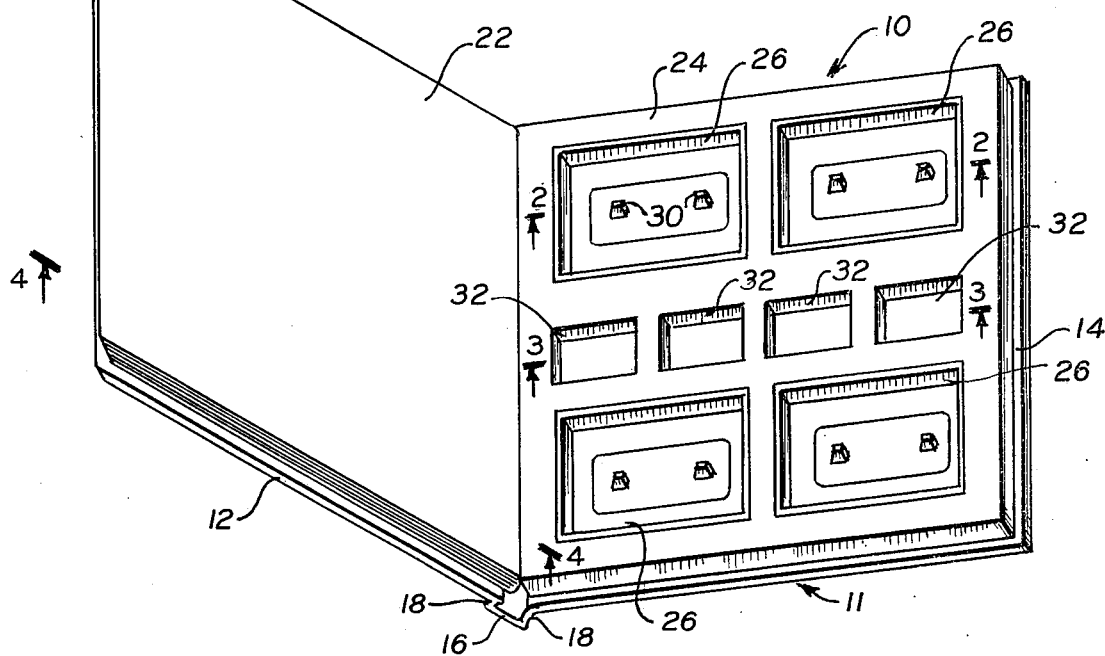
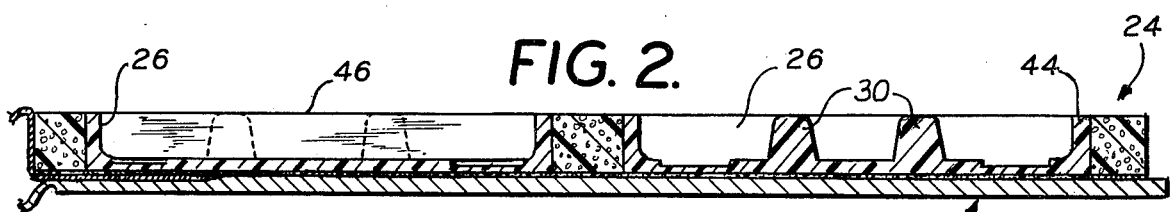
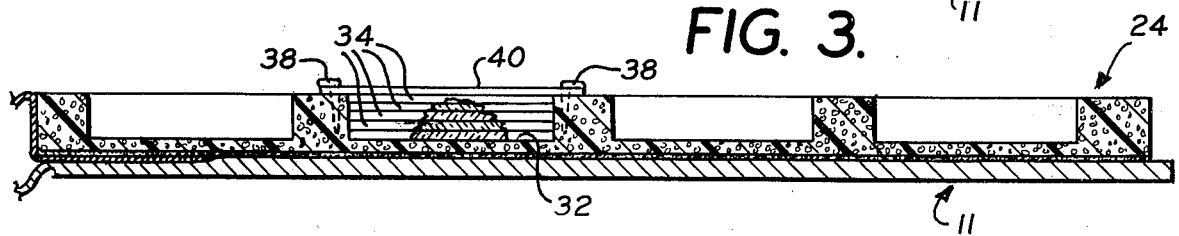
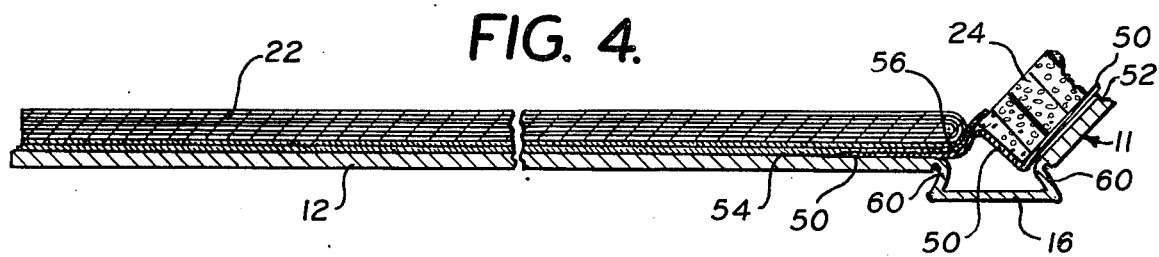

BOOK WITH SOUND TRACK AND VISUAL DISPLAY

BACKGROUND AND SUMMARY OF THE INVENTION

This invention is a novel construction for a book having a filler made up partly of printed pages and partly of a stiff and relatively thick panel which has one or more sockets therein for holding apparatus that is used in conjunction with the reading matter of the book. This apparatus preferably includes a sound record, such as a recorded tape cassette and may also include transparent slides that can be projected as illustrations for the book.

The preferred construction has hard covers that project beyond the top, bottom and front edges of the filler; and the relatively thick panel is preferably of the same dimensions as the pages and with its edges of the same color, so that when the book is closed it presents the appearance of an ordinary book without accentuating the presence of the relatively thick panel which contains sockets for holding the record and/or transparencies.

The illustrated embodiment of the invention has a loose back so that the book will lie in open position on a table or other support; and a tape to which the filler is connected, extends partway across the inside surfaces of the front and back panels of the cover with the tape at the rearward cover panel hidden by the socket panel and with the tape at the front cover hidden by an end paper or other lining of the inside front cover.

The sound record or recorded tape cassette is preferably held in its socket by friction; but in order to make the removal of the lantern slides more easily accomplished, they are preferably held in sockets of somewhat greater cross section than the lantern slides and the slides are held in the sockets by a band or strap extending across the open, front end of the lantern slide socket. An elastic band removably connected to hooks on opposite sides of the transparency socket provides an effective and inexpensive construction for retaining the slides in their socket.

The record and the transparencies are adjuncts for the bound sheets with their reading matter and/or pictures.

If the book is of large enough size, the socket panel can be made with a plurality of sockets for holding more than one cassette and/or groups of transparencies for projection.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is an isometric view showing the book of this invention partially open and with the socket panel exposed with all of the sockets empty and without retaining means for holding the transparencies in their sockets;

FIG. 2 is a sectional view taken on the line 2—2 of FIG. 1, with one socket filled with a recorded tape cassette which is shown in elevation;

FIG. 3 is a sectional view taken on the line 3—3 of FIG. 1 and showing one of the sockets filled with transparencies which are partly broken away and in section, and showing also an elastic band for holding the transparencies in the socket; and FIG. 4 is a sectional view taken on the line 4—4 of FIG. 1 showing the front cover panel, the bound sheets and the spine portion of the cover.

DESCRIPTION OF PREFERRED EMBODIMENT

FIG. 1 shows a book 10 with a cover 11 comprising a front cover panel 12 and a back cover panel 14 connected together by a spine portion 16 of the cover and having hinge lines 18 where the front and back panels connect with the spine portion 16.

The book filler includes a group of sheets 22 bound together as one or more signatures or in any suitable fashion; and these sheets contain printed matter and/or pictures relating to the subject matter of the book.

The filler also includes a panel 24, which will be referred to herein as the socket panel. This socket panel 24 is relatively thick and is substantially thicker than the cover panels of the book. There is at least one socket in the socket panel 24 for holding a record and preferably a recorded tape cassette. The construction shown in the drawing has four cassette holding sockets 26 with resilient studs 30 for holding the individual cassette in each of the sockets 26. Other friction means can be used if desired.

These cassette sockets 26 are lined with plastic cassette holders that are gripped in the corresponding sockets in the socket panel 24.

The socket panel 24 also contains a number of smaller sockets 32 of a size for holding a plurality of transparent slides 34 (FIG. 3). These transparencies or slides 34 are partially broken away and in section in FIG. 3. The sockets 32 are shown empty in FIG. 1.

The sockets 32 can be made of somewhat larger cross section than the slides 34 on at least one side to provide clearance for lifting the slides out of the socket 32, or the socket panel 24 may be tilted downward so that the slides will fall out by gravity.

Resilient and detachable means are preferably provided for holding the transparencies 34 in their socket 32. The construction shown in FIG. 3 includes two small hooks 38 attached to the socket panel 24 on opposite sides of the socket 32. An elastic rubber band 40 is stretched across the socket 32 and hooked over the hooks 38 to retain the transparencies 34 in their socket. For clearer illustration, these hooks 38 are shown extending above the top surface of the panel 24 but they can be located in shallow recesses so as not to have any projection above the top surface (in FIG. 3) which will contact with the back of the sheets 20 when the book is closed.

FIG. 2 shows a sectional view through the socket panel on the line 2—2 of FIG. 1 but on a larger scale. The sockets 26 are shown lined with plastic receptacles 44 for receiving a cassette 46 which is shown inserted in the socket 26 at the left hand part of FIG. 2.

The socket panel 24 is preferably made of foamed plastic such as the well-known foamed styrene commonly referred to as "Styrofoam". Other material can be used for the socket panel 24 and it can be of composite construction involving the use of corrugated board with covering sheets as needed to provide an attractive appearance. A stiff one-piece light plastic foam panel such as shown in the drawing is the preferred construction.

FIG. 4 shows the way in which the filler, comprising the sheets 22 and the socket panel 24, are connected with the cover panels 12 and 11, respectively. Both the sheets 22 and the panel 24 are secured to a backing tape 50 by adhesive. This backing tape 50 extends beyond the filler and part way across the width of the rear cover panel 11 and the front cover panel 12 as shown in FIG. 4. The tape 50 is firmly adhered to the inside surface of the cover panels 11 and 12.

In the construction illustrated in FIG. 4, the inside surface of the rear panel 11 is formed by a sheet 52, preferably made of paper; but this sheet is optional and the socket panel 24 can be adhesively adhered to the back panel 11 in a construction without the surface sheet 52.

The portion of the tape 50 which is adhered to the front cover panel 12 is covered by a paper sheet 54 which is preferably an end paper of the bound sheets 22. The first sheet (lowermost in FIG. 4) of the sheets 22 is adhered to the cover sheet 54 near the rearward edges of the sheets 22, the location being indicated by the reference character 56 in FIG. 4.

FIG. 4 shows the spine panel 16 joined to the rear and front covers 11 and 12, respectively, at hinge lines 60. It will be apparent from the construction shown in FIG. 4 that the book has a "loose-back" such as facilitates the lying open in flat condition when the book is so placed on a table or other support.

By having the edges of the pages 22 of the same color as the edges of the socket panel 24 and of the same dimensions, the edges of the sheets 22 are in alignment with the edges of the socket panel when the book is closed and this provides a neat and compact construction with the sockets completely covered by the group of sheets 22 so as to protect the apparatus in the sockets from dust and dirt.

The back of the last sheet of the sheets 22 can be left blank, if desired, so as to serve as a screen on which the slide transparencies can be projected if the user of the book wants to project the slides on a small screen. The inside surface of the front cover 12 can also be used as a screen when the sheets 22 are lying over the socket panel 24.

The preferred embodiment of the invention has been illustrated, but changes and modifications can be made and some features can be used in different combinations without departing from the invention as defined in the claims.

What is claimed is:

1. A hard cover book including in combination a cover having panels comprising front and back covers of the book, said panels including a first panel and a second panel connected with a spine panel of the cover, a socket panel of much greater thickness than the cover panels of the book, the socket panel being secured to the inside surface of the first panel and constituting an integral part of one cover of the book, the socket panel having a socket therein facing away from the panel to which it is secured, a filler bound to and within the cover, said filler comprising a group of pages bound together, a tape to which the filler is secured, the tape being secured, immediately beyond a spine portion of the filler, to inner sides of the front and back covers of the book whereby the pages are supported by the front and back covers, in substantially flat condition, when the pages are held open by a reader, end-papers of the filler adhered to and covering the surface of the second panel and part of the surface of the first panel, the filler pages and socket panel being secured to the cover with the top, bottom and front edges of the filler pages and the socket panel being spaced back by substantially equal distances from the corresponding edges of the cover panels to present the appearance, when closed, of a conventional hard cover book.

2. The book described in claim 1 characterized by the socket panel being made of a stiff, foamed plastic material with the socket shaped to hold a sound cassette which is removable from the socket for playing and which reproduces sound related with the reading matter of the bound pages of the book.

3. The book described in claim 1 characterized by the socket panel being made of stiff, light, foamed polystyrene plastic and with the edges of the plastic of the same color as the edges of said pages whereby the pages and the socket panel give the effect of a single filler in the cover when the book is closed.

4. The book described in claim 1 characterized by the socket in the socket panel having resilient means for holding a cassette in the socket.

5. The book described in claim 1 characterized by the socket panel having a socket for holding audio apparatus and another socket for holding visual apparatus, both of said apparatus being constructed and arranged for use in conjunction with the reading matter on the bound pages of the book.

6. The book described in claim 1 characterized by a tape cassette in the socket panel, a second socket in said socket panel, and a plurality of transparent projector slides in the second socket for projecting as an illustration relating to reading matter in the bound pages.

7. The book described in claim 6 characterized by releasable means extending across the second socket for holding the transparent projector slides in said second socket.

8. The book described in claim 6 characterized by the inside surface of the front panel of the cover being blank and of light color over most of its area for use as a screen for projecting the slides for small scale viewing of the transparency scenes.

9. The book described in claim 6 characterized by the socket for the cassette having surfaces that hold the cassette in the socket by friction, and an elastic band detachably connected with the socket panel and extending across the second socket for holding the slides in the second socket.

10. The book described in claim 1 characterized by the tape to which the pages and the socket panel are secured at their rearward ends, the cover panels being connected with the spine panel along hinge lines, and the tape extending across the front and back panels of the cover beyond the hinge lines and being connected with the front and back panels of the cover for a portion of the width of said front and back panels.

* * * * *